US006710302B1

United States Patent
Rennick

(10) Patent No.: US 6,710,302 B1
(45) Date of Patent: Mar. 23, 2004

(54) VEHICLE SENSOR ASSEMBLY INCLUDING INTEGRAL HEATING UNIT

(76) Inventor: Mark Rennick, 4966 Day Lily Way, Ackworth, GA (US) 30102

( * ) Notice: Subject to any disclaimer, the term of this patent is extended or adjusted under 35 U.S.C. 154(b) by 0 days.

(21) Appl. No.: 10/284,983

(22) Filed: Oct. 31, 2002

(51) Int. Cl.[7] .................................................. B60L 1/02
(52) U.S. Cl. ....................... 219/202; 219/544; 219/209; 340/435; 340/436; 340/903; 340/904
(58) Field of Search ................................. 219/202, 209, 219/544, 201; 340/941, 943, 933, 552–564, 903, 435–436, 904

(56) References Cited

U.S. PATENT DOCUMENTS

| 4,450,430 A | * | 5/1984 | Barishpolsky et al. ...... 340/904 |
| 5,229,975 A | * | 7/1993 | Truesdell et al. ........... 367/107 |
| 5,463,384 A | * | 10/1995 | Juds ........................... 340/903 |
| 5,734,336 A | * | 3/1998 | Smithline ................... 340/903 |
| 5,844,471 A | | 12/1998 | Daniel |
| 2003/0174053 A1 | * | 9/2003 | Rennick ..................... 340/435 |

FOREIGN PATENT DOCUMENTS

JP          2-151998       * 1/1990

* cited by examiner

*Primary Examiner*—John A. Jeffery
(74) *Attorney, Agent, or Firm*—Flynn, Thiel, Boutell & Tanis, P.C.

(57) ABSTRACT

A sensor assembly includes an integral heating unit. The sensor assembly includes a sensor housing which can be attached to an exterior surface of a vehicle. A transducer is seated in the sensor housing. The transducer is configured to receive interrogation signals from a controller and to transmit signals in response to the interrogation signals. A heating unit is positioned in the sensor housing. The heating unit includes a shell including a recess which is sized and configured to receive the transducer. A heating coil formed of a high resistance wire is embedded in the shell. The heating coil is configured to radiate heat to warm the transducer to melt built up ice and snow which can block signals emitted by the transducer.

14 Claims, 7 Drawing Sheets

VEHICLE SENSOR ASSEMBLY INCLUDING INTEGRAL HEATING UNIT

FIELD OF THE INVENTION

This invention relates generally to a vehicle sensor assembly and, more particularly, to a vehicle sensor assembly including an integral heating unit.

BACKGROUND OF THE INVENTION

Proximity detection systems are increasingly included on vehicles. These detection systems supplement the vehicle driver's vision by sensing the presence of objects which are located in the driver's blind spots or are otherwise difficult for the driver to see. Typical detection systems include a number of sensors which are positioned at various locations on the vehicle. The sensors can be any suitable sensors, such as ultrasonic, infrared or radar transducers. The sensors are in communication with a central controller, such as a microprocessor or engine control unit. The controller regulates the actuation of a user interface which is configured to generate an audio and/or visual warning to the vehicle driver. If one or more of the sensors detects an object within a predetermined proximity of the vehicle, a signal is transmitted to the controller. The controller processes this signal and transmits a control signal to the user interface. A warning is then generated by the user interface to alert the driver of the presence of the object.

A disadvantage of traditional detection systems is that reliability is often compromised during inclement weather. Ice, frost or snow built up on or around the sensors or the sensor housing impairs the ability of the sensors to operate satisfactorily. For instance, where the sensor is an ultrasonic sensor, accumulated snow or ice on the sensor housing blocks the transmission of signals from the sensor. The accumulation also prevents the sensor from receiving ultrasonic waves deflected from an object near the vehicle. Prevented from reliable signal transmission and receipt, the sensor is rendered useless.

Recent attempts were made to prevent cold weather conditions such as ice and snow from impairing the performance of proximity detection systems. One result of these attempts are detection systems which include a heating element positioned in each sensor housing. The heating element is activated by the controller upon receipt of an appropriate trigger signal. For instance, the controller could be triggered to activate the heating coil if a vehicle external temperature sensor detects a temperature below a predetermined threshold. Once activated, the heating element heats the sensor and the surrounding sensor housing, thus melting the ice and snow.

While such detection systems were created for improved performance, they typically suffer from one or more deficiencies. The heating elements in these systems are generally either too large or poorly positioned. The result is often a sensor which either continuously detects itself or which detects nothing. The former condition results where the heating element deflects signals back to the sensor; the later where the signals are blocked by the heating element but not deflected back to the sensor. Attempts were made to minimize or reposition the heating element to correct this problem. However, these attempts yielded heating elements which were too small or too remote from the front of the sensor to effectively remove built up snow and ice and to maintain the sensor housing free from such accumulation.

SUMMARY OF THE INVENTION

This invention is directed to a new and useful sensor assembly. The sensor assembly includes a sensor housing configured for attachment to an external surface of a vehicle. A transducer is positioned in the sensor housing and is configured to receive interrogation signals from a controller. The sensor assembly also includes a heating unit. The heating unit includes a solid, single layer shell configured to receive the transducer. A heating coil is embedded in the shell. The heating coil is configured to radiate heat as a result of current applied across the coil. The radiated heat warms the transducer, causing snow and ice to melt and preventing further accumulation thereon.

The heating unit is created by winding a length of wire around a core to form a work piece. The core is positioned in a mold. Heated plastic material is injected into the mold. The temperature of the heated plastic material is sufficient to melt the core. The result is a solid shell including a heating coil embedded therein.

Owing to the structure of this assembly, a heating unit is created which is suitable for use with various sensor assemblies. Since the heating coil is formed around and supported by a core which is sacrificed during construction, the heating coil can be formed from a delicate wire having a relatively small diameter. Additionally, since the heating coil is formed in the interior of the sensor shell, appropriate sizing of this component will prevent the heating coil from interfering with signal transmission or reception. The result is a heating unit with a heating element which is sized to sufficiently heat the surrounding sensor housing while being appropriately sized and positioned to not interfere with sensor function.

BRIEF DESCRIPTION OF THE DRAWINGS

This invention is pointed out with particularity in the accompanying claims. The above and further features and benefits of this invention are better understood by reference to the following detailed description, as well as by reference to the following drawings in which:

DETAILED DESCRIPTION

Figure 1:
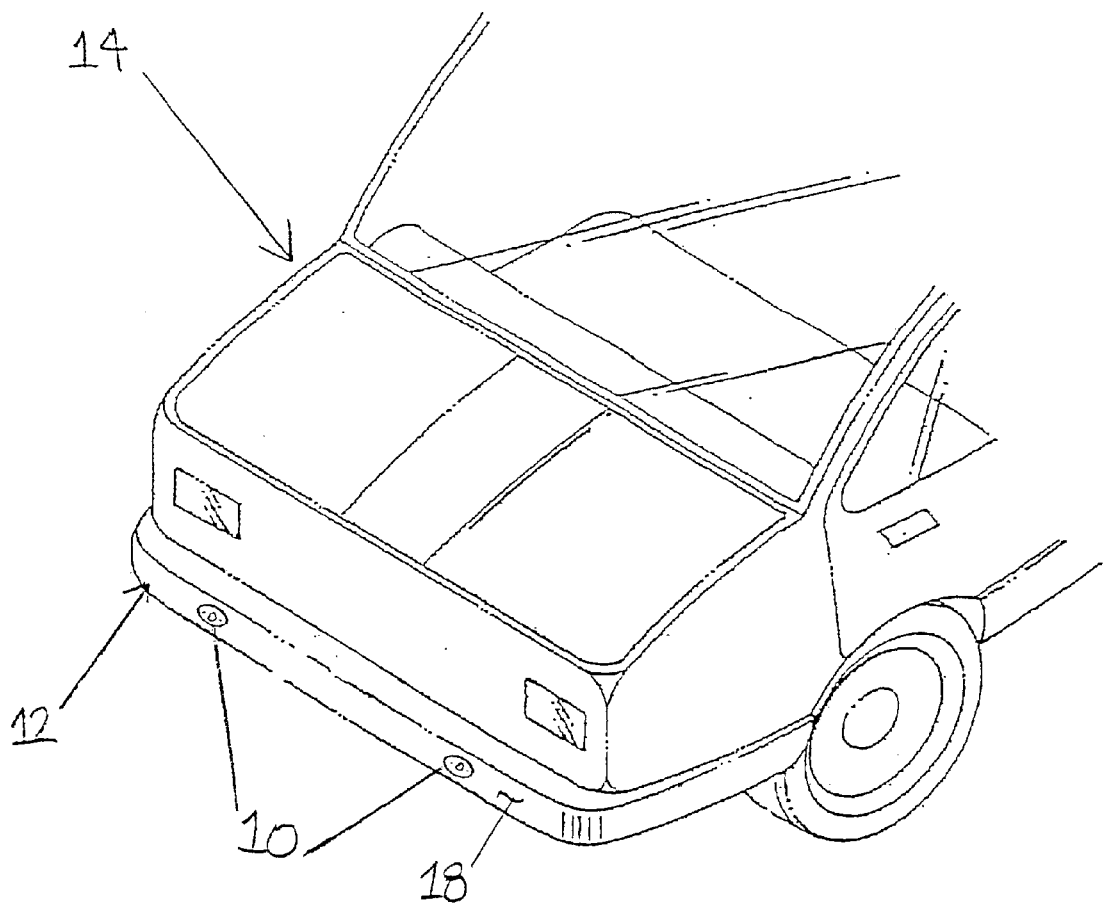
FIG. 1 is a perspective view of a vehicle bumper including a sensor assembly with integral heating unit according to the present invention.
Figure 2:
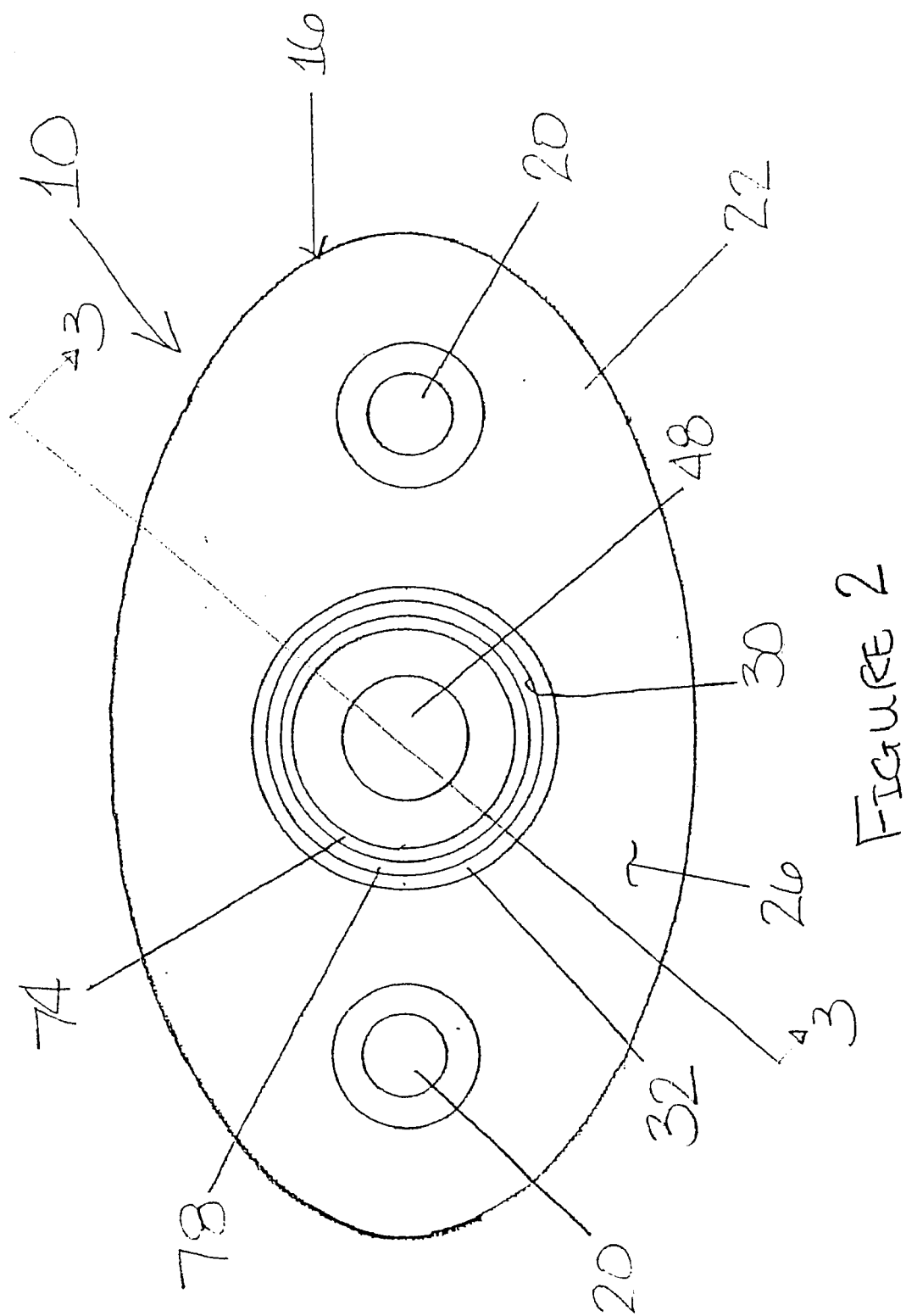
FIG. 2 is a front view of the FIG. 1 sensor assembly.

Referring now to FIGS. 1 and 2, there is illustrated a bumper 12 of a vehicle 14. Mounted on the vehicle bumper 12 are two sensor assemblies 10. Each sensor assembly 10 includes a mounting socket 16, or sensor housing, in which other sensor assembly components are seated. Each mounting socket 16 is attached to an outer surface 18 of the vehicle bumper 12 by one or more bolts 20.

Figure 3:
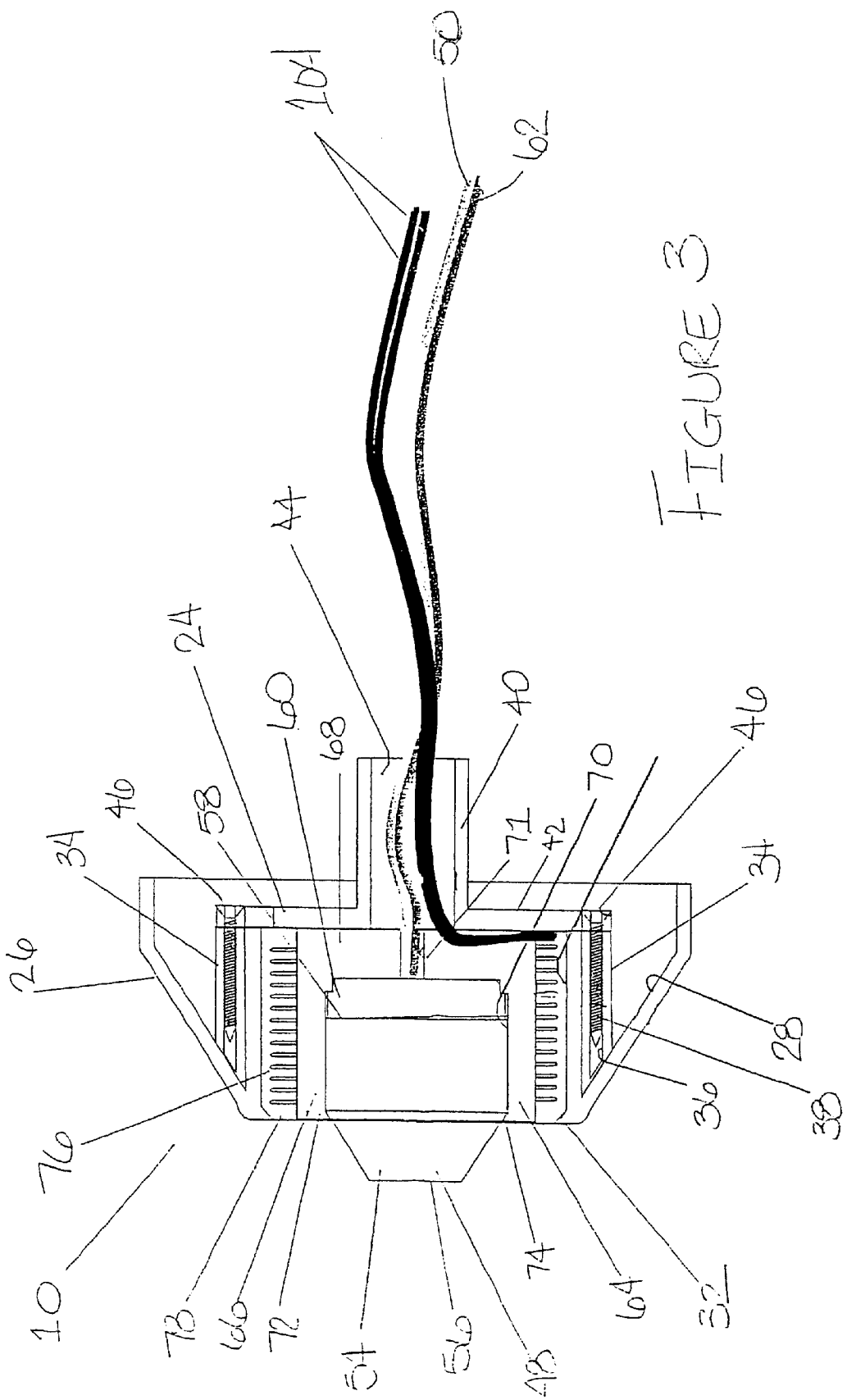
FIG. 3 is a cross-sectional view of the FIG. 2 sensor assembly along the section lines 6—6.

Referring now to FIGS. 2 and 3, one of the sensor assemblies 10 is illustrated in greater detail. The mounting socket 16 is composed of polypropylene or another material which will not degrade when exposed to various environmental conditions, such as fiberglass filled acrylonitrile-butadiene-styrene (ABS) or short linked carbon fiber. The material is also strong enough to withstand at least minor impacts. The mounting socket 16 is constructed of a face plate 22 and a back plate 24. The face plate 22 has a front surface 26 and a back surface 28. The face plate 22 defines a central recess 30 which is sized and shaped to house other sensor assembly components. An upper portion of the central recess 30 projects inward to form a rim 32 (FIG. 3). The face plate front surface 26 preferably curves away from the central recess 30 in all directions, as illustrated. Such contouring prevents the mounting socket 16 from blocking signals transmitted to and from the sensor assembly 10. The central recess 30 is flanked by two piers 34 which extend from the back surface 28. Each pier 34 defines a well 36 that is sized to receive a screw 38 which secures the back plate 24 to the face plate 22.

A sleeve 40 projects from a back surface 42 of the back plate 24. The sleeve 40 defines a central opening 44 which is sized to facilitate electrical connection between sensor assembly components and electrical components positioned external to the sensor assembly 10 mounted elsewhere on the vehicle 14. The sleeve 40 acts as a guide during installation of the complete assembly 10. The sleeve 40 also provides protection to the various wires extending from other sensor assembly components so the wires are not damaged during or chaffed after installation. Two bores 46 extend through the back plate 24 on opposite sides of the sleeve 40. Each bore 46 is preferably countersunk to receive the head of one screw 38. When the mounting socket 16 is assembled, each bore 46 is aligned with one of the wells 36 in the face plate back surface 28 to receive a screw 38.

Figure 6:
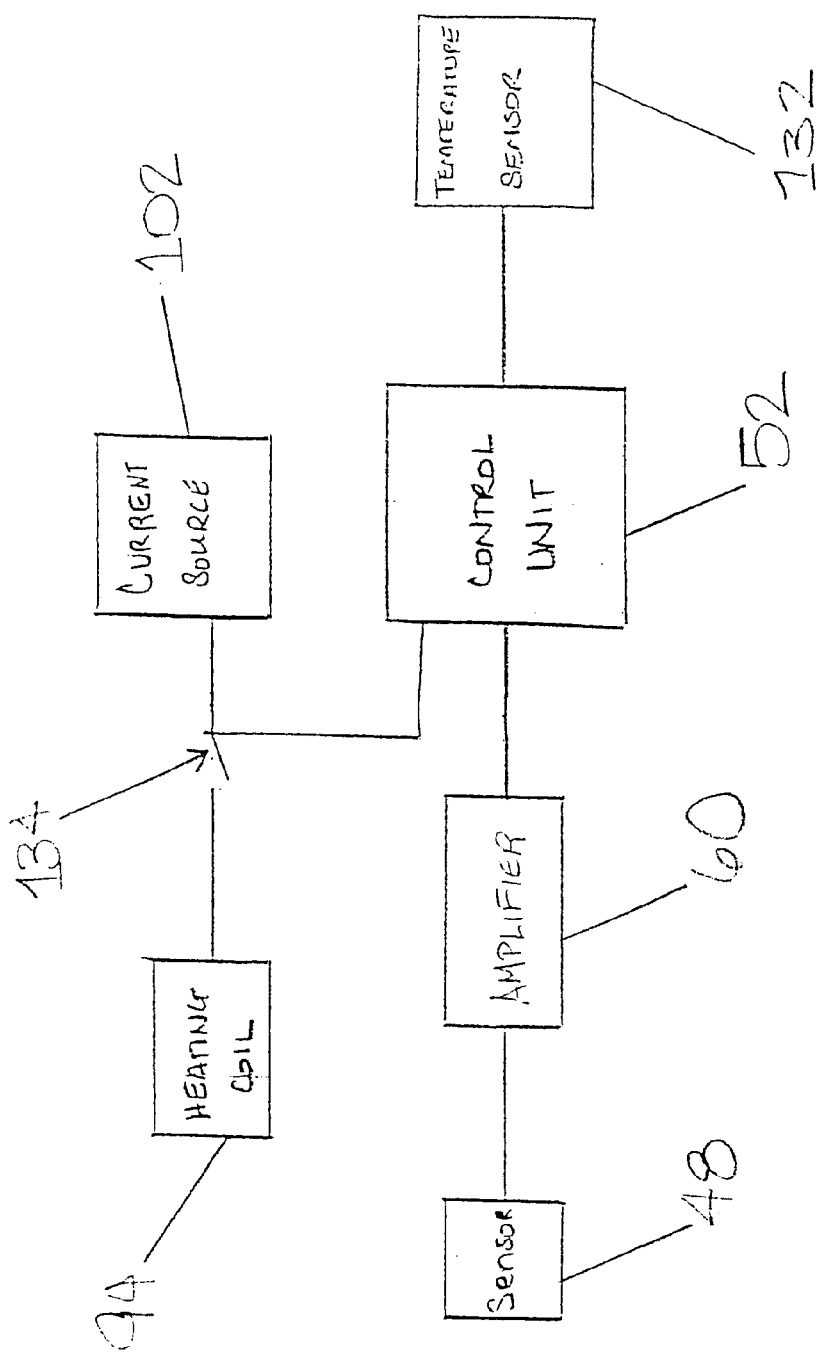
FIG. 6 is a block diagram of the sensor assembly of FIG. 1.

The sensor assembly 10 includes a sensor, transducer 48. The transducer 48 illustrated herein is a piezoelectric transducer such as those manufactured by Coligen Corporation in Zhuhai, China. The transducer 48 is configured to transmit and receive ultrasonic signals between 20 KHz and 140 KHz, most commonly signals of about 40 KHz. It should be appreciated that the present invention is suitable for use with other types of sensors, including those configured to generate infrared or radar signals. A wire 50 extends between the transducer 48 and a control unit 52 (FIG. 6) positioned external to the sensor assembly 10. The transducer 48 receives activation signals generated by the control unit 52 via the wire 50. The transducer 48, in response to the activation signals, emits a short period ultrasonic pulse signal to the ambient environment. After the pulse is emitted, the transducer 48 receives any reflected ultrasonic pulse and generates object sensed signals as a function of the received reflected pulse.

The transducer 48 has an outer shell 54 formed of a suitable material, such as aluminum. The outer shell 54 is a die cast component formed from a circumferentially extending side wall. The outer shell 54 has a closed upper end 56 and an open lower end 58. The outer shell 54 of the transducer 48 houses a solid silicone core (not shown). Embedded within the silicone core is a piezoelectric wafer (not shown). To manufacture the transducer 48, a first amount of silicone is injected into the shell 54. Once the silicone is partially set, a piezoelectric wafer is positioned on the silicone. The partially set silicone and the piezoelectric wafer are covered with a second amount of silicone which fills the remainder of the shell 54.

Returning to FIGS. 2 and 3, the sensor assembly 10 includes a low voltage amplifier 60, such as those manufactured by Coligen Corporation. The amplifier 60 is preferably a high impedance, low gain amplifier. Optimally, the gain across the amplifier 60 is less than ten. The amplifier 60 is installed in series with the transducer 48. A wire 62 extends from the amplifier 60 for electrical connection to the control unit 52. Signals transmitted by the transducer 48 toward the control unit 52 for processing are first received by the amplifier 60 via a wire (not shown). The amplifier 60 amplifies these signals and transmits the augmented signals to the control unit 52 for processing via the wire 62. In some versions of the invention, the amplifier 60 may also filter out noise from the signal produced by the transducer 48.

It should be appreciated that the amplifier 60 could be omitted from the sensor assembly 10. In such an assembly, the transducer 48 would transmit signals directly to the control unit 52. However, signals generated by a transducer, such as that illustrated herein, tend to rapidly degrade in quality when transmitted over distances greater than about nine feet. Thus, where the transducer 48 is located greater than nine feet from the control unit 52, such as when the sensor assembly 10 is positioned on a bus or other large vehicle, signal quality can be extremely poor. Use of the amplifier 60 to filter and amplify signals from the transducer 48 is therefore preferable to ensure that a strong, reliable signal is received by the control unit 52.

Returning now to FIGS. 2 and 3, the transducer 48 and amplifier 60 are seated in an isolator 64. The isolator 64 is a tubular member formed with a side wall 66 which extends upward from a bottom wall 68. The isolator 64 is formed from a suitable material, such as silicone. The side and bottom walls 66 and 68 surround a central recess 70 which is sized to snugly receive the transducer 48 and the amplifier 60. An upper surface 72 of the side wall 66 extends into the recess 70 to form a rim 74. While the transducer 48 and the amplifier 60 are compressed within the recess 70, the rim 74 provides an additional barrier to prevent these components from sliding out of the isolator 64. A central opening 71 is formed in the bottom wall 68 of the isolator 64. The central opening 71 is sized to receive the wires 50 and 62 which extend from the transducer 48 and the amplifier 60 when the sensor assembly 10 is assembled.

Figure 4:
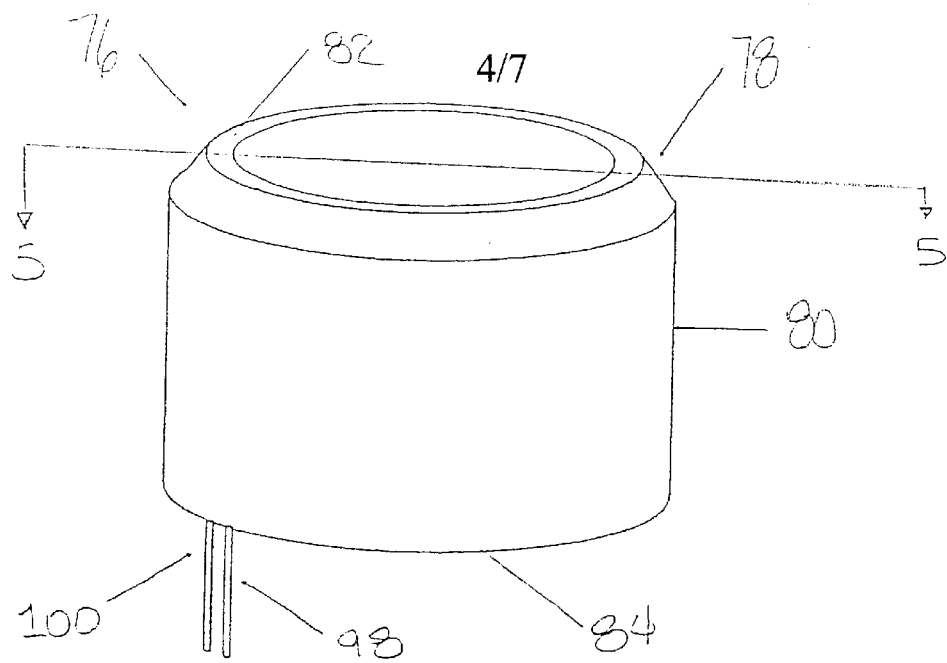
FIG. 4 is a perspective view of the heating unit of the FIG. 2 sensor assembly.
Figure 5:
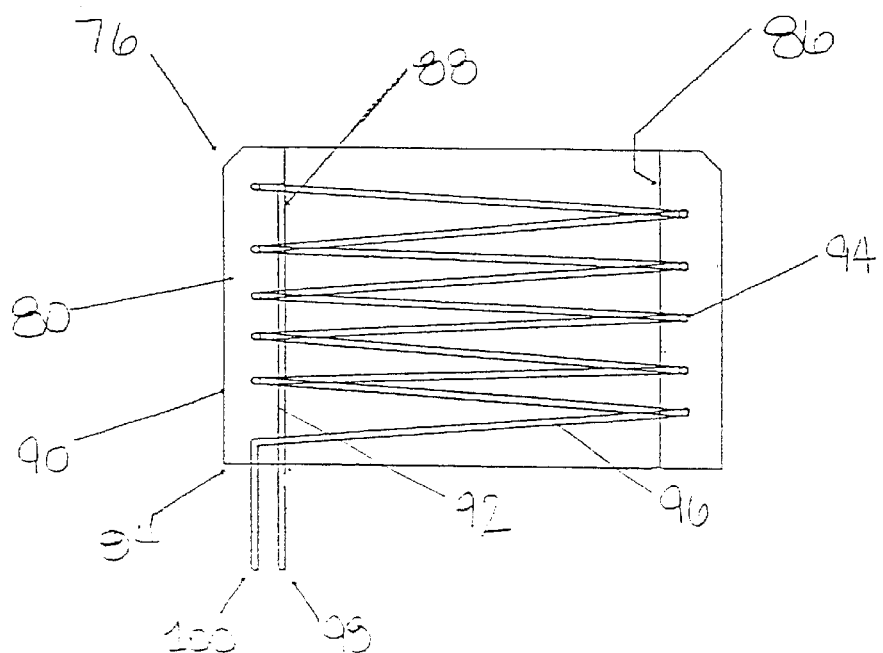
FIG. 5 is a cross sectional view of the FIG. 4 heating unit along the section lines 4—4.

The isolator 64 is seated in a heating unit 76 positioned in the mounting socket central recess 30. The heating unit 76 is now described by reference to FIGS. 4 and 5. The heating unit 76 includes a shell 78 formed of a suitable plastic material, such as polycarbonate plastic or other injection moldable material. Examples of suitable polycarbonate material are those materials sold under the trademarks MAKROLON by Bayer and LEXAN by General Electric Corporation, each of which have a melt point of about 310° F. The shell 78 has a tubular side wall 80 formed of the molded material. The side wall 80 has a top surface 82 and a bottom surface 84. A recess 86 is defined by the side wall 80. The side wall 80 has an inner facing surface 88 adjacent the recess 86 and an opposing outer facing surface 90. A groove 92 is formed in the inner facing surface 88 and extends transversely along the recess 86.

A heating coil 94 is disposed inside the shell 78. The heating coil 94 is composed of a length of high resistance wire 96 which is wound to form a coil. The wire 96 diameter is sufficiently large to allow the heating coil 94 to radiate adequate heat to warm the transducer 48 and the mounting socket 16. Preferably, the wire 96 is 22 gage wire. The wire 96 has a first end 98 which extends transversely within the groove 92 and terminates adjacent the shell wall bottom surface 84. A second end 100 of the wire 96 extends downward from within the shell wall 80 and terminates adjacent the first end 98. Termination of the wire first and second ends 98 and 100 in such an orientation is desirable to facilitate connection of the heating coil 94 to a current source 102 (FIG. 6) via wires 104.

Figure 7:
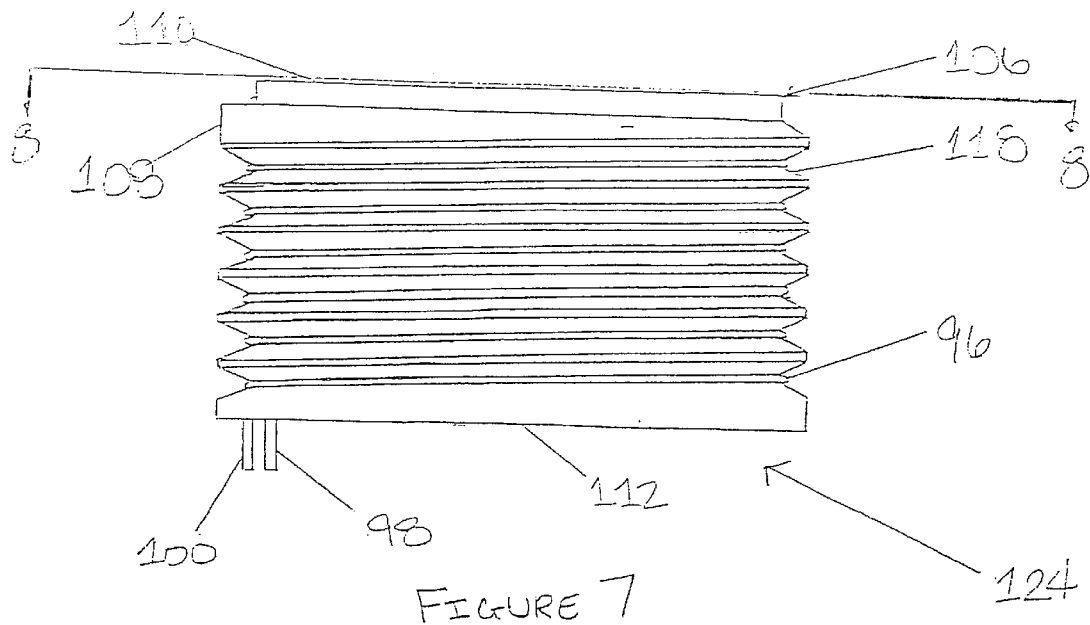
FIG. 7 is a side view of a wire wrapped work piece utilized to form the FIG. 4 heating unit.
Figure 8:
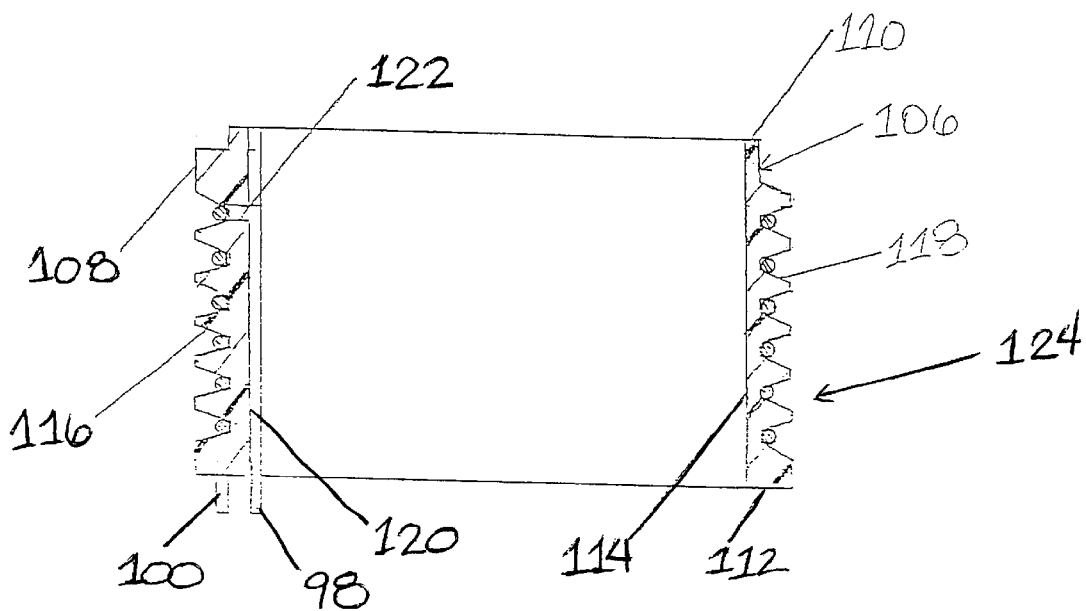
FIG. 8 is a cross sectional view of the FIG. 7 wire wrapped work piece along the section lines 8—8.

To manufacture the heating unit 76, a length of wire 96 is wound around a core 106 that has a generally tubular shape. Referring now in addition to FIGS. 7 and 8, the core 106 is formed of a suitable material, such as the polycarbonate plastic utilized to form the shell 78. The core 106 is a hollow component formed with a tubular wall 108. The wall 108 has an upper end 110 and a lower end 112. The wall 108 includes an inner surface 114 adjacent the hollow core 106 interior and an opposing outer surface 116. A helically shaped groove 118 is formed along the outer surface 116 of the core 106. The groove 118 winds around the outside of the core 106 between the wall upper and lower ends 110 and 112. A groove 120 extends longitudinally along the wall inner surface 114 between the wall upper and lower ends 110 and 112. An upper end 122 of the groove 120 opens into the groove 118 near the upper end 110 of the core 106. The width of each groove 118 and 120 is fractionally larger than the diameter of the wire 96.

A work piece 124 is formed by winding the wire 96 around the core 106 in the groove 118 with the wire first end 98 extending downward from the lower core end 112. The wire second end 100 is inserted in the groove 120 and extends along the core inner surface 114. The wire second end 100 terminates adjacent the wire first end 98 projecting downward from the core 106, as illustrated.

It should be appreciated that the heating coil 94 can be formed around a core 106 which omits the grooves 118 and 120. However, guiding the wire 96 in the groove 118 ensures that the wire 96 is wound around the core 106 in the desired number of windings. Guiding the wire 96 is the groove 118 also ensures that a consistent spacing is maintained between the wire 96 windings during molding of the heating unit 76. Further, guiding the wire second end 100 in the groove 120 ensures the wire second end 100 terminates sufficiently close to the wire first end 98 to allow the heating coil 94 to be securely wired to the current source 102.

Figure 9:
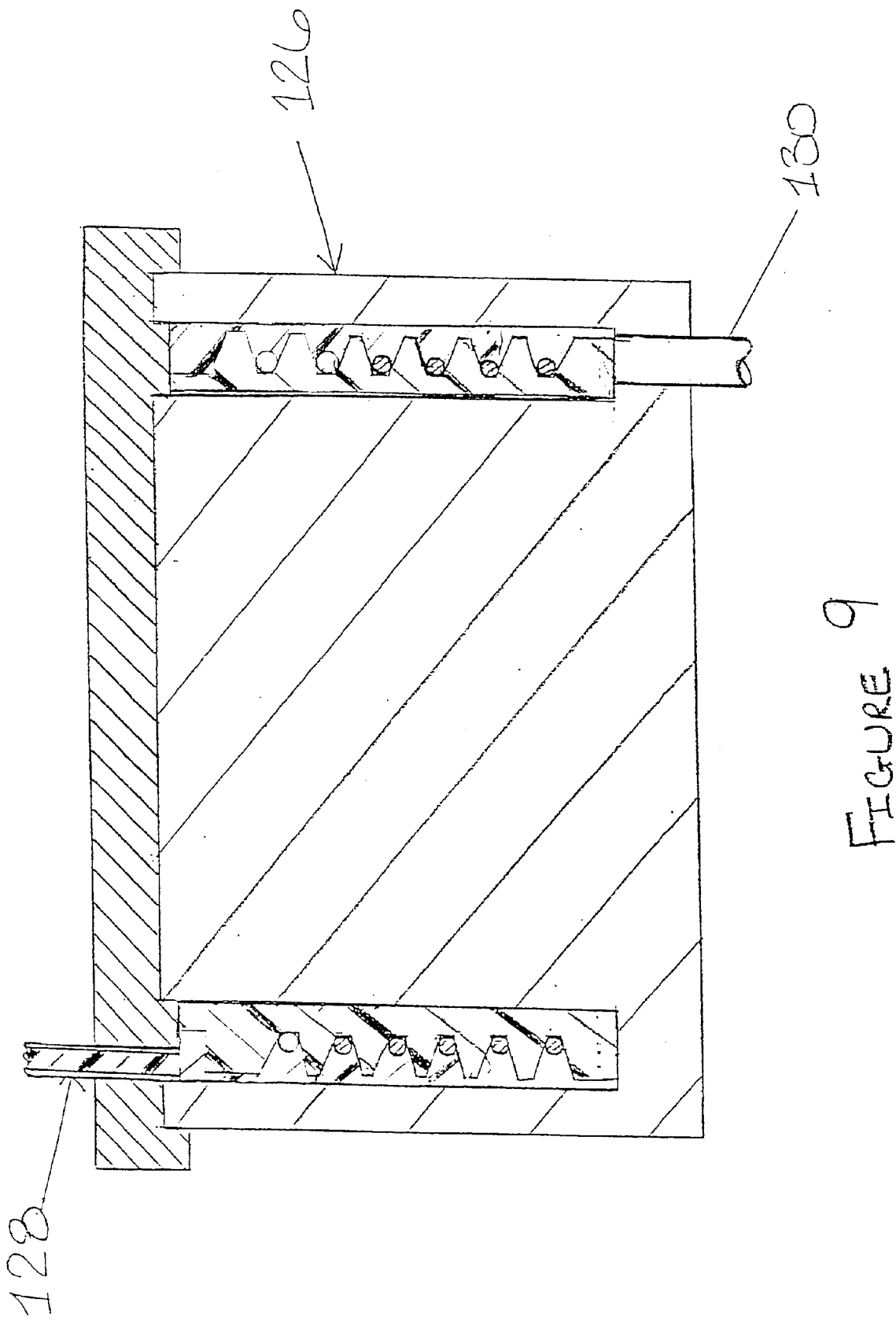
FIG. 9 is a cross sectional view of the FIG. 7 wire wrapped work piece positioned in a mold during formation of the FIG. 4 heating unit.

The work piece 124 is positioned in a mold 126, as illustrated in FIG. 9. In some preferred versions of the invention, the mold is closed and the work piece 124 is heated to a temperature of 250° F. An amount of polycarbonate resin is pressurized to a pressure between 12000 and 20000 PSI and, in some preferred versions of the invention, at about 14200 PSI. This pressurization causes the polycarbonate resin to liquefy. As a result of the pressurization, the polycarbonate is heated to a temperature of about 370° F.

Once the molten polycarbonate and the work piece 124 reach their respective desired temperatures, the molten polycarbonate is injected into the mold 126 through the inflow port 128. Molten polycarbonate surrounds the outer surface 116 of the core 106 and the exposed surfaces of the wire 96. In a preferred version of this invention, the open space in the mold 126 surrounding the work piece 124 is filled by the molten polycarbonate in approximately one half of a second.

As the molten polycarbonate surrounds the work piece 124, heat is radiated through the core tubular wall 108. The core 106 polycarbonate starts to liquefy and fuse with the injected polycarbonate. Extra polycarbonate material which may be present in the mold 126 exits the mold through an outflow port 130. Owing to the pressure and viscosity of the polycarbonate and the speed with which the liquid polycarbonate material in the mold 126 sets, the heating coil 94 remains static during injection. When the injected and core 106 polycarbonate in the mold 126 sets, the result is a solid shell 78 including an embedded heating coil 94 formed from the fused core 106 material and injected material. In a preferred version of the invention, approximately three second elapse between closing of the mold 126 to opening the mold to reveal a completed heating unit 76.

To determine the configuration of the work piece 124 and the shell 78 to be manufactured, materials and final system characteristics are considered. These characteristics include the inherent properties of the polycarbonate material used to form the shell 78 and the size and shape of the transducer 48 and mounting socket 32 with which the heating unit 76 will be used. Factors influenced by these characteristics include the wall thickness of the shell 78, the size and shape of the molded shell 78, the number of windings of the wire 96 around the core 106 and the spacing between the wire 96 windings.

Regarding the thickness of the shell wall 80, the shell 78 should have a wall thickness which is large enough to ensure a robust heating unit 76 and small enough to sufficiently conduct heat. The thickness of the shell wall 80 is preferably at least 2.5 mm and less than 4.0 mm. A shell wall 80 having a thickness of less than 2.5 mm is too delicate for assembly into and use with most sensor assemblies. Additionally, a shell wall 80 thickness less than 2.5 mm is not sufficiently sized to properly encase the heating coil 94. Further, while the strength of the wall 80 increases as the thickness increases, the polycarbonate material used to form the shell 78 is not an optimal conductor of heat. Thus, when the shell wall 80 has a thickness greater than about 4.0 mm, heat produced by the coil 94 will not be adequately transferred to the transducer 48 and the mounting socket 16 to melt snow and ice from these components.

Regarding the configuration of the molded shell 78, transducers are available in a variety of sizes and shapes. The shell 78 is sized and shaped appropriately so that signals transmitted by the transducer 48 are not blocked by any portion of the shell 78. The shell 78 also has a recess 86 which is sufficiently sized to receive the transducer 48 and other sensor assembly components. Similarly, the shell 78 is also sized and shaped to be received by the mounting socket 16.

Transducer 48 size also influences the number of wire 96 windings of the heating coil 94 and the spacing between windings. The number and spacing of the windings of the wire 96 should be such that the heating coil 94 produces a sufficient amount of heat to prevent snow and ice from interfering with sensor performance. Additionally, when the transducer 48 is an ultrasonic transducer, the spacing of the wire 96 windings should be such that the ultrasonic signals emitted by the transducer 48 are not reverberated back into the sensor assembly 10. When the transducer 48 is configured as illustrated herein, the windings for the coil 94 are preferably spaced at about 0.7 to 2.0 mm, and optimally at about 1.0 mm.

Regarding the number of wire 96 windings in the heating coil 94, a heating unit 76 designed to accommodate a transducer 48 having of various diameters may contain a coil 94 having an increased or decreased number of windings in the wire 96. A heating unit 76 designed to carry a transducer having a diameter of 2.0 cm may include a coil 94 having six windings of the wire 96 whereas a heating unit 76 designed to carry a transducer having a diameter of 3.0 cm may include a coil 94 having ten windings. An increase in the number of wire 96 windings will result in a slight increase in the wattage required by the heating unit 76. However, the overall wattage requirement will remain under seven watts.

ASSEMBLY

To assemble the sensor assembly 10, the transducer 48 and amplifier 60 are electrically connected via one or more wires (not shown). The wire 50 is then connected to the transducer 48 and the wire 62 is connected to the amplifier 60 to facilitate electrical connection of these components to the control unit 52. The amplifier 60 and transducer 48 are fitted in the isolator 64 so the wires 50 and 62 extend through the opening 71. The flexible silicone forming the isolator 64 compresses the amplifier 60 and the transducer 48 when these components are positioned in the isolator recess 70. The transducer 48 and the amplifier 60 are further secured in the isolator 64 between the bottom wall 68 and the rim 74.

The isolator assembly is then seated in the heating unit 76 in the recess 86 and secured therein by a press fit as the isolator 64 is compressed by the shell 78 to approximately a 0.5 mm compressive fit. This compression of the isolator 64 by the shell 78 further secures the transducer 48 and the amplifier 60 within the recess 70. This subassembly is then fitted into the central recess 30 of the mounting socket 16 so the wires 50 and 62 extend through the opening 44. The back plate 24 is positioned against the back surface 28 of the face plate 22 so the bores 46 are aligned with the wells 36. Screws 38 are then inserted into the bores 46 and threaded into the wells 36 to secure the other sensor assembly 10 components in the mounting socket 16. The mounting socket is then attached to the outer surface 18 of a vehicle 14 by one or more bolts 20.

OPERATION

The heating coil 94 is activated in response to any suitable vehicular or environmental condition. For instance, the heating coil 94 may be activated when a temperature sensor 132 in the vehicle 14 detects an external temperature below a minimum threshold, for instance 40° F. The control unit 52 receives data signals from the temperature sensor 132 representative of the detected temperature. When the detected temperature is below a predetermined minimum, the control unit 52 generates a signal which closes a switch 134 located between the current source 102 and the heating coil 94.

Once the switch 134 is closed, current flows between the current source 102 and the heating coil 94. As current flows through the heating coil 94, the wire 96 radiates heat. Heat radiated by the wire 96 is conducted by the shell 78 and transferred through the isolator 64 to the transducer 48. The radiated heat also warms the front surface 22 of the mounting socket 16. As the transducer 48 and the mounting socket front surface 22 are warmed, accumulated snow and ice melt from the transducer 48 and the mounting socket 16. The heating coil 94 continues to radiate heat until the control unit 52 opens the switch to end current flow to the heating coil 94.

The control unit 52 could be programmed to open the switch 134 after a predetermined period of time or upon any suitable environmental condition, such as the elevation of environmental temperature above the minimum threshold. Alternatively, the switch 134 may be opened and/or closed in response to a vehicular condition, such as activation or deactivation of the vehicle 14 defrost cycle. It is further envisioned that a delay of 5 to 20 minutes from the time that the temperature sensor indicates that the environmental temperature has risen above the preset point for the switch to open will improve performance of the system by anticipating that material from the road surface may be deposited on the sensor and require removal by melting.

At the desired time, such as when the vehicle 14 speed falls below a minimum threshold such as 8 mph, the control unit 52 transmits activation signals to the transducer 48. In response to the activation signals, short period ultrasonic pulse signals are emitted into the ambient environment by the transducer 48. Any reflected ultrasonic pulses are received by the transducer 48, which then generates object sensed signals in response to the received reflected pulses. Since snow or ice built up on or around the transducer 48 was removed, the ultrasonic pulse signals and the reflected signals are not blocked. The transducer 48 continues to transmit and receive signals until the control unit 52 signals the transducer 48 to cease signal emission.

The heating unit 76 includes a small, delicate heating coil 94 embedded in a shell 78 which houses the transducer 48. Owing to the small size of the heating coil 94 and the configuration thereof, signals transmitted from the transducer 48 are neither blocked nor deflected by the heating coil 94. The heating coil 94 is sufficiently sized and tuned to radiate adequate heat within the mounting socket 16 to sufficiently clear the transducer 48 and the mounting socket 16 of snow and ice. The sensor assembly 10 of the present invention thus has a heating unit 76 that heats the transducer 48 to ensure the assembly 10 operates in inclement weather and does not interfere with performance of the assembly. In addition, the heating unit 76 can be shaped in any suitable manner for use with various transducers and mounting/installation techniques.

It should be appreciated that the foregoing description is for the purposes of illustration only, and further alternative embodiments of this invention are possible without departing from the scope of the claims. While the present sensor assembly is illustrated with a heating unit 76 including a shell 78 having a single heating coil 94 embedded therein, the heating unit 76 could instead include multiple coils 94 embedded in the shell 78. For instance, two heating coils 94 could be embedded in the shell wall 80. The number and spacing of the wire 94 windings in the multiple coils 94 could be either identical or different. The coils 94 could be connected to the current source 102 either individually or together. The determination of whether to conduct heat through one or more of the coils 94 could be made based on any suitable vehicular or environmental condition, such as ignition of the vehicle or temperature detected by the temperature sensor 100. Further, each of the heating coils 94 could be electrically connected to a multi-state switch. These heating coils 94 could be controlled so that the amount of heat produced by the multiple coils 94 is inversely proportional to the ambient temperature.

In addition to the above modifications, the heating unit 76 could be formed so that the transducer 48 is integral therewith. To manufacture such a heating unit, the transducer 48 is positioned in the mold 126 within the work piece 124. Molten plastic is injected into the mold 126 to surround the work piece 124 and the transducer 48. Once the molten plastic material is set, the result is a shell 78 having an embedded heating coil 94 and transducer 48 molded therein.

Additionally, the amplifier 60 could also be molded integral with the shell 78. Here the work piece 124 is configured so that when the transducer 48, amplifier 60 and work piece 124 are positioned in the mold 126, only the transducer 48 is surrounded by the coiled wire 96. The transducer 48 and the amplifier 60 could additionally be spaced apart in the mold 124 so that molten plastic could form a layer between these components. This might be preferable to prevent the amplifier 60 from being exposed to heat from the heating coil 94 during operation, which could damage delicate internal components.

Further, a microprocessor could be positioned in the sensor assembly 10 in addition to, or in place of, the amplifier 60. The microprocessor could process signals from the transducer 48 within the sensor assembly 10 and transmit a resultant data signal to the control unit 52. The additional microprocessor could also be configured to close the switch 134 to connect the heating coil wire 96 to the current source 102. Still further, the heating coil 94 could be configured so that the wire 94 windings extend transversely between the shell top and bottom surfaces 82 and 84. Such a heating coil could extend around all or only a portion of the circumference of the shell 78. Such a configuration could be preferable when only components positioned on one side of the shell 78 require heating.

Still further, while a single sensor housing, mounting socket 16, is illustrated herein, it should be appreciated that the sensor assembly 10 of the present invention can be configured for use with a variety of sensor housings. For instance, the sensor assembly 10 could be positioned in a mounting socket which is configured for mounting on top of a vehicle 14 surface, such as the upper surface of the vehicle bumper 12. Such a mounting socket could include an upper plate and a lower plate which define a central recess when secured together. The sensor assembly 10 could be positioned in the recess so the transducer 48 can direct signals toward the rear of the vehicle 14.

In addition, the sensor assembly 10 could be mounted in a mounting socket which is recessed within a surface of the vehicle 14 so the top of the transducer 48 is flush with the vehicle 14 surface when the sensor assembly 10 is assembled. One such mounting socket could include a sleeve which is adhered to the outer surface of the shell 78 by a suitable means, such as an adhesive or by molding. Such a sleeve could have an outer surface which is threaded. A housing component could be positioned in a recess formed in the vehicle, wherein the housing component defines a recess having a series of internal threads which are complimentary to the sleeve external threads. The sleeve could then be threaded into the housing to secure the sensor assembly 10 to the vehicle 14.

Further, it should be appreciated that the disclosed injection molding technique for formation of the heating unit 76 could be modified. For instance, liquid polycarbonate or another suitable injection moldable liquid material could be substituted for the polycarbonate resin. If desired, the resin or liquid to be injected could be heated by an independent heating means either during or after pressurization.

Still further, any suitable molding technique could be used to form the heating unit 76. One possible alternative process is cold cast molding. In this alternative, the work piece core 106 could be cold molded from polyurethane or another suitable material. The work piece 124 would be positioned in the mold 126. A suitable material, such as polyurethane or a two-stage vinyl would then be poured in the mold 124 around the work piece 124. The added liquid material and the work piece 124 would be catalyzed in the mold.126 to form the heating unit 76.

Thus, although particular preferred embodiments of the present invention have been disclosed in detail for illustrative purposes, it will be recognized that variations or modifications lie within the scope of the present invention and do not depart from the spirit of the invention, as set forth in the foregoing description and drawings, and in the following claims.

What is claimed is:

1. An object proximity sensor assembly for a vehicle comprising:
    a sensor housing configured for attachment to an external surface of said vehicle, a recess being formed in said sensor housing;
    a heating unit fitted into said recess and comprising:
        a solid, single layer shell including a side wall;
        an opening surrounded by said shell side wall; and
        a heating coil embedded in said shell side wall; and
    a sensor seated in said opening and configured to emit interrogation signals into the ambient environment to detect the presence of an object or sense an ambient environmental condition representative of the proximity of an object and generate signals representative of the environmental condition.

2. The sensor assembly of claim 1, wherein said sensor is configured to emit ultrasound signals.

3. The sensor assembly of claim 2, wherein said sensor is a piezoelectric transducer.

4. The sensor assembly of claim 1, including an amplifier connected in series with said sensor, said amplifier being configured to receive said signals generated by said sensor representative of the environmental condition and amplify said signals.

5. The sensor assembly of claim 1, including an isolator seated in said shell opening, said isolator including a side wall which surrounds an isolator recess; and
    said sensor being fitted into said isolator recess.

6. The sensor assembly of claim 5, wherein said isolator is formed of a flexible material and said sensor is compressed by said isolator in said recess.

7. The sensor assembly of claim 6, wherein said isolator side wall extends upward from a bottom wall and includes an upper rim extending into said isolator recess; and
    said sensor is trapped in said isolator recess between said upper rim and said bottom wall.

8. The sensor assembly of claim 7, including an amplifier which is connected in series with said sensor and is positioned in said isolator recess.

9. The sensor assembly of claim 1, wherein said shell is formed of an injection moldable polycarbonate material.

10. The sensor assembly of claim 1, wherein said shell side wall has a thickness between 2.5 and 4.0 mm.

11. The sensor assembly of claim 1, wherein said heating coil is formed from 22 gage wire.

12. The sensor assembly of claim 1, wherein said shell side wall has top and bottom surfaces; and
    said heating coil is formed from a length of wire helically coiled within said shell side wall, said wire having a first end which originates at said shell side wall bottom surface and a second end which extends transversely along said opening toward said bottom surface to terminate adjacent said first wire end.

13. The sensor assembly of claim 12, wherein a groove is formed along said shell side wall adjacent said opening and extends transversely between said top and bottom surfaces; and
    said wire second end extends along said groove toward said bottom surface.

14. The sensor assembly of claim 1, wherein said heating coil is formed from a length of wire which is helically wound around an interior of said shell side wall in a plurality of windings; and
    each of said plurality of windings are spaced apart by a distance between 0.7 and 2.0 mm.

* * * * *